ns Patent Office 3,551,998
Patented Jan. 5, 1971

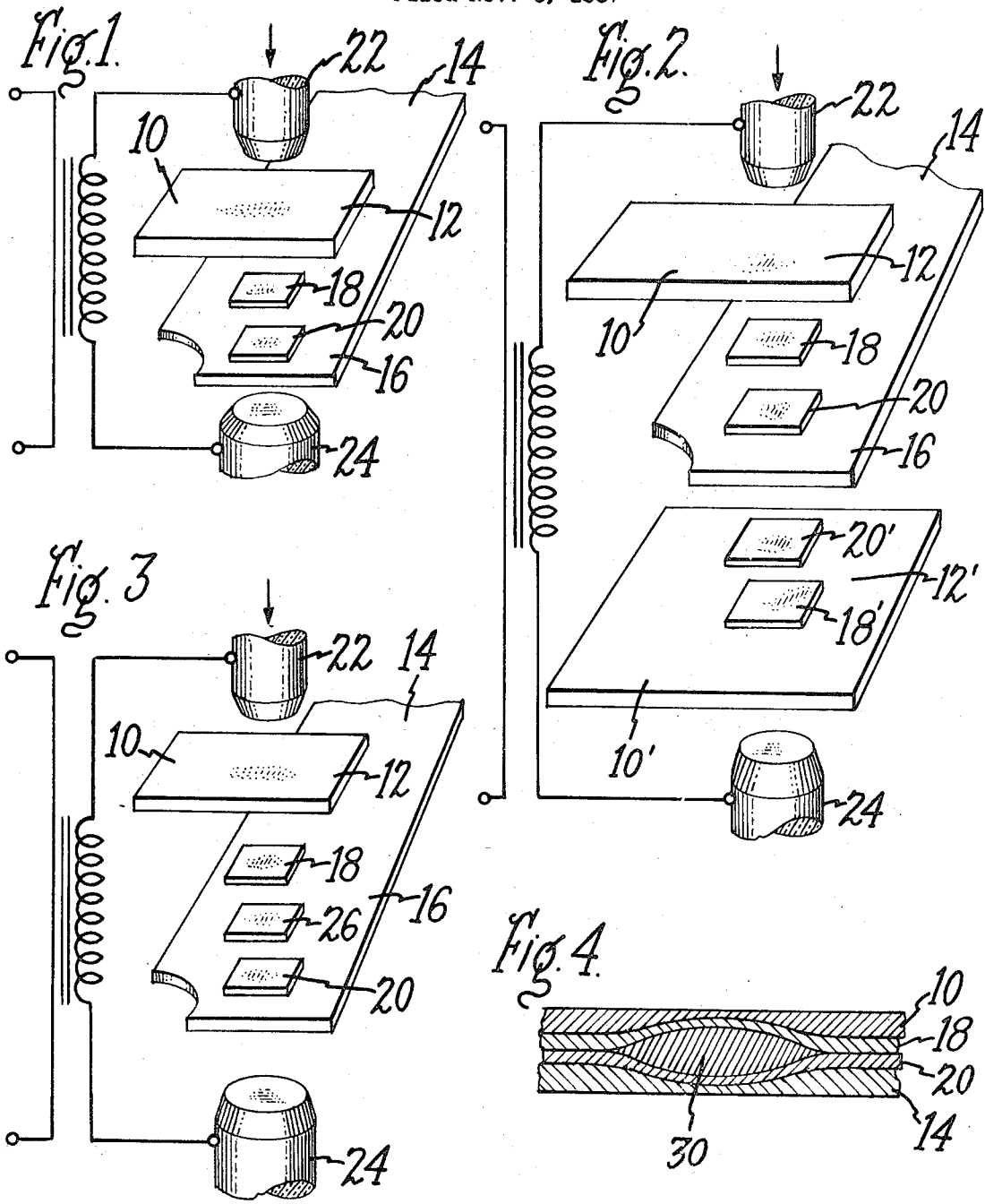

3,551,998
METALLURGICAL BONDING OF DISSIMILAR METALS
Moreland P. Bennett, Pittsfield, Mass., assignor to General Electric Company, a corporation of New York
Filed Nov. 8, 1967, Ser. No. 681,458
Int. Cl. B23k 31/02, 35/24
U.S. Cl. 29—498
3 Claims

ABSTRACT OF THE DISCLOSURE

A metallurgical bond between dissimilar metals is obtained by using compatible shims between the meal members which will form a metallurgical bond to each other and to the dissimilar metals. Where copper and aluminum are the metals, a copper-silver-phophorus shim and silver shim are used. A tin shim may be used between the copper-silver-phosphorus shim and the silver shim to improve their bonding characteristics. Heat and pressure are used to form the bond.

BACKGROUND OF THE INVENTION

This invention relates to the joining of dissimilar metals and more particularly, to a method of forming a metallurgical bond between dissimilar metals and to the joint formed thereby.

The problems which are inherent in forming a joint between dissimilar metals are well known to those skilled in the metal joining art. In general dissimilar metals, such as for example, copper and aluminum, do not form good metallurgical bonds with each other. The joints usually formed are unsatisfactory. This is particularly true for electrical applications since such joints tend to have a high electrical resistance. Further in most prior methods of joining dissimilar metals such as for example, copper and aluminum, the joints so formed have been marked by very weak mechanical properties.

Recently, in the electrical apparatus field, the use of aluminum strip winding to form coils has become widely used throughout the industry. This has lead to a requirement for finding a more advantageous way of joining the aluminum to different types of dissimilar metals. This has become necessary due to the use of leads and crossovers of dissimilar metals, such as for example, copper, that are considered desirable as the leads when the aluminum strip material is used for windings.

It has recently been disclosed in Pat. No. 3,310,388 that bonds between dissimilar metals, such as aluminum and copper can be made by the use of a silver brazing alloy in apertures in the aluminum member with the dissimilar metal such as copper on opposite sides of the aluminum metal. A brazing heat melts the alloy and forms a strong low resistance bond between the members of the sandwich structure.

While this bond provides a good electrical and mechanical joint between the members, it has been considered desirable to obtain a secure electrical connection between dissimilar metals using only single pieces of each type of metal. Further, it is considered desirable to make such joints without the need of apertures in either of the members to be joined.

It has recently been discovered that a secure electrical and mechanical joint can be formed between dissimilar members by using metal shims between such members where the metal shims provide good metallurgical bond with each other and each shim would provide a good metallurgical bond with one of the dissimilar metal members.

It is therefore one object of this invention to provide a novel method of joining dissimilar metals.

Another object of this invention is to provide a novel joint between dissimilar metals.

Still a further object of this invention is to provide a novel joint between dissimilar metals where the joint has excellent electrical characteristics and high mechanical strength.

Yet another object of this invention is to provide a novel joint between dissimilar metals comprising a pair of dissimilar metal members with metal shims therebetween forming good metallurgical bonds between the shims and the dissimilar members.

A still further object of this invention is to provide a novel metallurgical bond between dissimilar metals by use of metallurgical bonding between metal shims placed between the dissimilar metal members.

SUMMARY

Briefly, in one form, this invention comprises a method of joining dissimilar metals in which the metals to be joined have portions thereof aligned with each other. Metal shims capable of forming metallurgical bonds with each other are placed between the aligned portions with one metal shim adjacent one metal member and being capable of forming a metallurgical bond therewith. The other metal shim is placed adjacent the other metal member and is capable of forming a metallurgical bond therewith. Heat and pressure are applied to the aligned portion to diffuse the metal shims into the metal members and into each other. When cooled, a low resistance, high mechanical strength bond is formed between the dissimilar metals. The invention also comprises the joint made by this method.

The invention which it is desired to be protected will be particularly pointed out and distinctly claimed in the claims appended hereto. However, it is believed that this invention and the manner in which its various objects and advantages are obtained as well as other objects and advantages thereof, will be better understood by references to the following detailed description of preferred embodiments thereof, especially when considered in the light of the accompanying drawings.

DRAWINGS

FIG. 1 is a perspective view of one form of joint structure which may be used in carrying out this invention;

FIG. 2 is a perspective view of another form of the structure which may be used in carrying out this invention;

FIG. 3 is a perspective view of still another embodiment of a structure which may be used in carrying out the metallurgical bonding of this invention; and FIG. 4 is a diagrammatic sectional view of one form of joint made according to a preferred embodiment of this invention.

DETAILED DESCRIPTION OF THE PREFERRED EMBODIMTNT

As hereinbefore mentioned, it has been discovered that a good low resistance, high mechanical strength bond can be formed between dissimilar metals by use of compatible metal shims placed between the aligned portions of dissimilar metals which are to be joined. A sandwich structure is formed which comprises one of the dissimilar metal members, a metal shim compatible with such dissimilar metal adjacent thereto, a second metal shim compatible with said first metal shim, and another dissimilar metal below said second shim with the second shim also being compatible with the second dissimilar metal member. When heat and pressure are applied to this sandwich structure, the metal shims will melt and diffuse into the dissimilar metals, forming metallurgical bonds with each of the dissimilar metals they are adjacent to and will also form a good metallurgical bond with each other.

It will be apparent that any number of different types of dissimilar metals may be joined by use of this invention, merely by providing metal shims between such dissimilar metals where the metal shims are compatible with each other and also compatible to the adjacent metal members. This invention also contemplates the use of a third metal shim which is placed between said first two metal shims wherein the third metal shim will aid in forming a good metallurgical bond between the first and second metal shim. As the description proceeds, the use of the different types of shims and the manner of assembling the structure for joining dissimilar metals in accordance with this invention will be better understood.

Referring now to the drawings in which like numerals are used to indicate like parts throughout the various views thereof, there is shown, particularly in FIG. 1 of the drawing, one type of structure which may be used to obtain a good electrical and mechanical bond between a pair of dissimilar metal members. Considering FIG. 1, there is shown one type of metal member indicated at 10 having a portion 12 which is to be joined to a second metal member 14, particularly at the portion 16 thereof. As is shown in FIG. 1, a pair of metal shims 18 and 20 are placed between the aligned portions 12 and 16 of the dissimilar metal members 10 and 14. As will be understood, metal shim 18 is a metallic member which, when melted will form a good metallurgical bond with the metal member 10. In the same manner, the metal skin 20 is a metallic member which will form a good metallurgical bond with the metal member 14. Additionally, it is required that each of metal shims 18 and 20 be compatible with each other such that each will form a good metallurgical bond with the other.

As can be seen from FIG. 1, electrode members 22 and 24 are provided adjacent the portions 12 and 16 of metal members 10 and 14 which are to be joined. In the structure shown in FIG. 1, the electrodes 22 and 24 are connected through a transformer to provide resistance heating of the joint between metal members 10 and 14. As will be understood, when electrodes 22 and 24 are brought in contact with the portions 12 and 16, of metal members 10 and 14, pressure is applied by the electrodes forcing the structure comprising the metal member 10, the shims 18 and 20 and metal member 14 into close contact with each other. Heat will be generated by the resistance of the electrodes and joint, such heat being sufficient to cause metal shims 18 and 20 to diffuse into metal members 10 and 14 respectively, and also into each other to form good metallurgical bond therebetween.

In one form of this invention, metal member 10 is a copper strip while metal member 14 is an aluminum strip. The shim 18 is preferably a copper-silver and phosphorus metallic alloy while the metal shim 20 is a commercially pure silver shim. When aluminum and copper are used as above indicated, it is desired that the electrode 24 be a water-cooled copper or copper alloy electrode to prevent undue heating of the aluminum member 14. As will be understood, as heat and pressure are applied by means of electrodes 22, 24, the shims 18 and 20 will diffuse into the copper 10 and the aluminum 14 and also into each other. In one particular embodiment of the invention, the heat of the joint was between 1200 and 1400° Fahrenheit, with a current of approximately 5000 amperes while the pressure applied by the electrodes 22 and 24 was approximately 1300 pounds per square inch. The electrode 24 prevented undue heating of the aluminum member 14 which did not reach more than approximately 500° F., at the contacting surface of the aluminum and the electrode.

In another form of the invention, the metal member 10 was copper while the metal member 14 was steel. In this form, a copper-silver and cadmium shim 18 and a tin-copper shim 20 were used between the copper and steel members. The electrodes used were copper and molybdenum which at a current of approximately 18,000 amperes provided a temperature of approximately 1500° F. The pressure applied was approximately 10,000 pounds per square inch. A joint between steel and aluminum may also be made by this invention. With member 10 steel and member 14 aluminum, shim 18 was copper-silver-cadmium, while shim 20 was silver. Carbon electrodes were used with a current of approximately 2000 amperes which yielded a temperature at the joint of approximately 1400° F. The pressure applied was approximately 500 pounds per square inch.

It will be understood that the time for making the various joints will vary with the heat and pressure use. In the above examples, the copper to aluminum bond required approximately 20 seconds while the steel to aluminum bond only required approximately 10 seconds. In general, where a lower heat is used a longer time period will be required to obtain a good metallurgical bond. The electrodes used will determine the heat, pressure and time cycle to be used. As will be understood, the type of electrode will also determine the current necessary to obtain the necessary heat for the joint. As is well known, carbon electrodes require less current to obtain a given heat than do electrodes of refractory material, such as molybdenum.

From the above description it will be apparent that the method of this invention will provide metallurgical bonds between any types of metals or metal alloys where compatible shims are used.

Referring now to FIG. 2 of the drawing, there is shown a perspective view of a second structure which may be utilized to form a good, low electrical resistance, high mechanical strength bond between a pair of similar metals 10 and 10' and a dissimilar metal 14. In this embodiment, the portions 12 and 12' of the similar metal members 10 and 10' are aligned on opposite sides of the portion 16 of metal member 14 as shown. A pair of metallic shims 18 and 20 are placed between metal members 10 and 14 in the same manner as previously discussed with reference to FIG. 1. Similarly, a second pair of metallic shims 18' and 20' are placed between the aligned portions 12' and 16 of metal members 10' and 14 as shown. Again, a pair of electrode members 22 and 24 are shown which will be used to provide electrical resistant heat and pressure to the structure shown to melt the shims 18, 20 and 18', 20' and diffuse these shims into their adjacent metal members and also into each other to form good metallurgical bonding therebetween. Of course it will be apparent that metal member 14 may be aluminum or some other type of metal as previously discussed with reference to FIG. 1, while metal members 10 and 10' may be copper or other types of dissimilar metal with reference to metal 14. In such instances, of course, the shims 18 and 20 and 18', 20' will depend upon the types of dissimilar metals which are to be joined.

Referring now to FIG. 3 of the drawing, there is shown another form of the bonding structure which may be used in accordance with this invention. Utilizing the same numbers as in FIG. 1, it will be seen that the metal member 10 is to have its portion 12 joined with metal member 14 at its portion 16. A pair of shims 18 and 20 are provided with metal shim 18 being adjacent to and compatible with metal member 10 while shim 20 is adjacent to and compatible with metal member 14. In the embodiment shown in FIG. 3, a third metal shim 26 is provided between the metal shim 18 and 20. The metal shim 26 is compatible with both metal shim 18 and 20 and will assist these shims 18 and 20 in bonding to each other. It is believed that the use of the third shim improves the bonding characteristics of the other shims with respect to each other. The electrodes 22 and 24 are again provided in order to provide resistant heat and pressure to the structure to thereby diffuse the metal shims into their adjacent metal members and each other to thereby form a good metallurgical bond between the joint members.

Where the metal member 10 is copper and the metal member 14 is aluminum then the shim 18 will be a copper-silver-phosphorus shim while shim 20 will be a commercially pure silver shim. The shim 26 in this instance will be a tin shim since it provides improved metal lurgical bonding between the copper-silver-phosphorus shim and the silver shim. Where the metal member 10 is steel and metal member 14 is aluminum and shim 18 is a copper-silver-cadmium metal shim and shim 20 is a silver metal shim, the shim 26 may be a tin-copper metal shim which will improve the compatibility of the metal shims 18 and 20.

Referring to FIG. 4, of the drawing, there is shown a diagrammatic section view of the joint formed in accordance with the structure set forth in FIG. 1 of the drawing. As is shown, the metal member 10 forms the top portion of the joint while metal member 14 forms the lower portion thereof. As is evident from FIG. 4, the shim 18 has diffused into metal member 10 and has formed a bond therewith while the shim 20 has diffused into metal member 14 and formed a metallurgical bond therewith. Additionally, there is shown the area 30 between shims 18 and 20 which, as will be understood, shows the diffusion of the two shims 18 and 20 into each other to form a third metallurgical bond in the area 30.

From the above description of the various embodiments of this invention, it will be apparent to those skilled in the art that by means of this invention, a strong mechanical and low resistance electrical bond may be provided between various types of dissimilar metals. While the various embodiments have been set forth in the description of this invention, it will of course, be apparent to those skilled in the art that various changes may be made in the various embodiments shown without departing from the spirit and scope of the invention, especially as it is defined in the appended claims.

What is claimed as new and which it is desired to secure by Letters Patent of the United States is:

1. A method of joining dissimilar metals comprising the steps of,
    (a) aligning two dissimilar metals to be joined,
    (b) Inserting between said aligned dissimilar metals a pair of metal shims,
        (1) said metal shims being compatible with each other and with the metal members adjacent thereto,
    (c) applying resistant heat and pressure sufficient to diffuse said metal shims into said adjacent metal members and into each other to thereby form a metallurgical bond between said dissimilar metals and said metal shims.

2. A method of joining dissimilar metals as set forth in claim 1 in which a sandwich structure is formed with the same metal as the other members and a metal dissimilar to said outer members as the inner member and in which said metal shims are placed between said inner member and each said outer member.

3. A method of joining copper and aluminum comprising the steps of,
    (a) aligning at least one copper member and one aluminum member to be joined,
    (b) inserting between said aligned copper and aluminum members a metal shim of cooper-silver-phosphorus and a metal shim of silver,
        (1) said copper-silver-phorphorus shim adjacent said copper member and said silver shim adjacent said aluminum member,
    (c) applying heat and pressure to said aligned members sufficient to diffuse said copper-silver-phosphorus shim into said copper shim and said silver shim into said aluminum member, and to bond said copper-silver-phosphorus shim to said silver shim.

References Cited
UNITED STATES PATENTS

| | | | |
|---|---|---|---|
| 1,975,105 | 10/1934 | Keller et al. | 29—199 |
| 3,030,703 | 4/1962 | Wirsing, Jr. | 29—497 |
| 3,395,443 | 8/1968 | Polinko, Jr. | 29—498 |

JOHN F. CAMPBELL, Primary Examiner

R. J. SHORE, Assistant Examiner

U.S. Cl. X.R.

29—197, 199, 501, 504